United States Patent
Grinnell

(10) Patent No.: US 11,275,294 B2
(45) Date of Patent: Mar. 15, 2022

(54) COUPLER FOR COUPLING TO AN ARTICLE OF WEAR

(71) Applicant: Axon Enterprise, Inc., Scottsdale, AZ (US)

(72) Inventor: Edward Grinnell, Scottsdale, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 17/118,942

(22) Filed: Dec. 11, 2020

(65) Prior Publication Data

US 2021/0181609 A1    Jun. 17, 2021

Related U.S. Application Data

(60) Provisional application No. 62/946,941, filed on Dec. 11, 2019.

(51) Int. Cl.
G03B 17/56    (2021.01)
F16M 13/04    (2006.01)
F16M 11/04    (2006.01)

(52) U.S. Cl.
CPC ........... *G03B 17/561* (2013.01); *F16M 11/04* (2013.01); *F16M 13/04* (2013.01); *G03B 17/566* (2013.01)

(58) Field of Classification Search
USPC ....................................................... 396/419
See application file for complete search history.

(56) References Cited

U.S. PATENT DOCUMENTS

| | | |
|---|---|---|
| D762,942 S | 8/2016 | Patulski |
| D770,168 S | 11/2016 | Patulski |
| D773,782 S | 12/2016 | Patulski |
| 9,512,969 B1 * | 12/2016 | Watson ..................... F21K 9/68 |
| 2013/0126565 A1 | 5/2013 | Rostami |
| 2017/0000246 A1 | 1/2017 | Dent |
| 2019/0113058 A1 | 4/2019 | Wine et al. |
| 2019/0246776 A1 | 8/2019 | Tran et al. |
| 2020/0245730 A1 * | 8/2020 | Grinnell ............ A44B 17/0047 |
| 2020/0337448 A1 * | 10/2020 | Grinnell ................... A45F 5/02 |
| 2021/0093028 A1 * | 4/2021 | Grinnell ................ F16M 13/04 |

FOREIGN PATENT DOCUMENTS

KR    10-2007-0112152 A    11/2007

OTHER PUBLICATIONS

International Searching Authority, International Search Report and Written Opinion for International Patent Application No. PCT/IB2020/061857 dated Mar. 15, 2021.

* cited by examiner

*Primary Examiner* — Clayton E. LaBalle
*Assistant Examiner* — Warren K Fenwick

(57) ABSTRACT

A coupler for coupling to a provided article of wear comprises a base plate and a buckle. The base plate may comprise a mount interface configured to couple with a provided body worn camera. The buckle may be configured to couple to the base plate over a provided article of wear to couple the base plate to the provided article of wear. The buckle may comprise a first part, a second part, a first joint, and a lock. The first part may be movably coupled to the second part. The lock may be configured to enable and prevent movement of the first part relative to the second part. In an unlocked state, the lock may enable movement of the first part relative to the second part. In a locked state, the lock may prevent movement of the first part relative to the second part.

20 Claims, 4 Drawing Sheets

COUPLER FOR COUPLING TO AN ARTICLE OF WEAR

FIELD OF THE INVENTION

Embodiments of the present invention relate to a coupler for coupling to an article of wear.

BACKGROUND OF THE INVENTION

Public safety personnel, such as police officers and firefighters, use cameras to capture events, so that a video and/or audio record exist of what happened in an incident. These cameras may be mounted on vehicles such as cars and drones, and they may also be worn on the body as body worn cameras. Numerous mounting systems exist to mount cameras to personnel.

It is often useful or necessary to secure an item onto a sheet of material, such as a fabric or item of clothing. As one example, it can be useful or necessary for a law enforcement officer to secure a body camera to the officer's uniform shirt. Such a connection is preferably made without damaging or altering the shirt. To that end, connection mechanisms are sold that incorporate one or more magnets, and including a part that is placed inside the shirt. The parts of this mechanism are arranged in a manner so that magnetic attraction through the sheet material of the shirt holds the camera in place on the shirt.

One drawback of this mechanism is that the magnets must be very strong to hold a heavy camera in place. The magnetic flux may interfere with circuitry of an electronic device, including circuitry associated with transmitting and/or receiving radio frequency signals. Also, lateral movement of the camera (sliding it along the surface of the shirt) can possibly dislodge the camera from the interior magnet. Finally, a magnetic mechanism can be painful if it closes on the user's finger.

BRIEF DESCRIPTION OF THE DRAWINGS

Embodiments of the present invention will be described with reference to the drawing, wherein like designations denote like elements, and.

Figure 1A:
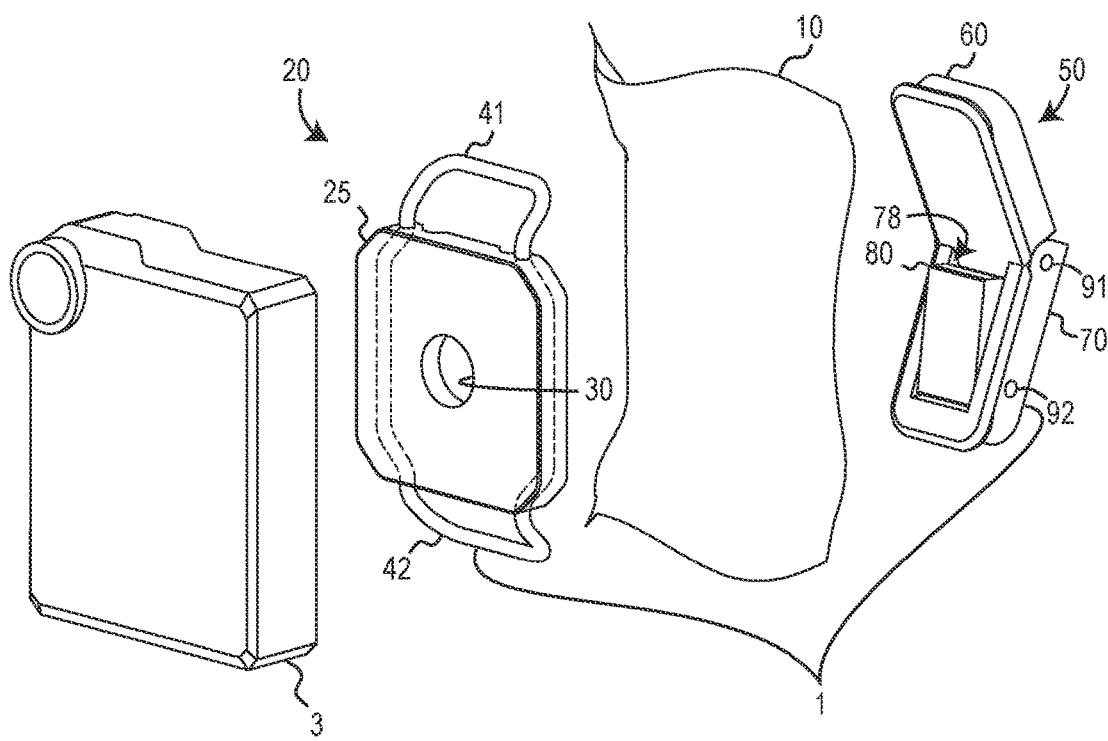
FIG. 1A is a front perspective exploded view of a coupler in accordance with various aspects of the present disclosure.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein refers to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

A coupler (e.g., mount, clothing mount, etc.) according to various aspects of the present disclosure, may include a first component (e.g., base plate, base, front plate, etc.) and a second component (e.g., buckle, clasp, bridge, retainer, rear plate, etc.). Each component may include physically separate, but engageable, structures and/or portions. The engageable structures and portions may be configured to engage one another to couple the base plate with the buckle. The base plate may releasably engage the buckle over an article of wear, thereby coupling the base plate and the buckle to the article of wear.

Each component of one or more components of a coupler may comprise one or more rigid, plastic materials, metal materials, and/or composite materials. A rigid material may include materials resistant to deformation under typical usage loads. The one or more rigid materials may include corrosion-resistant materials, UV resistant materials, and/or materials configured to withstand environmental factors Rigid materials may include metals and metallic alloys (e.g., aluminum, steel, titanium, etc.), composites (e.g., fiberglass, carbon fiber, etc.), and plastics (e.g., polycarbonate/acrylonitrile butadiene styrene, polyether ether ketone, Nylon 6/6, etc.). The rigid materials may also be treated (e.g., heat-treated, galvanized, anodized) and/or painted (e.g., powder-coated, c-coated, etc.).

An article of wear may include articles configured to be worn by a person or animal. For example, an article of wear may include a shirt, a jacket, a hat, a vest, a uniform, pants, gloves, shoes, etc. An article of wear may comprise a range of thicknesses, such as between 0.005 in to 0.150 in (0.127 mm to 3.810 mm). An article of wear may comprise various materials, such as stiff materials, flexible materials, elastic materials, synthetic materials, natural materials, and combinations thereof.

A base plate may be configured to releasably couple with a buckle over a provided article of wear. A base plate may be positioned on a first side of the article of wear and engage a buckle positioned on a second side of the article of wear. An article of wear may be disposed between the base plate and the buckle. Engagement of the buckle with the base plate over the article of wear may couple the base plate to the article of wear. Thus, an accessory may be coupled to an article of wear via the base plate without a need to alter (e.g., cut, sew, modify, etc.) the article of wear.

A base plate may comprise a center region including a mount interface (e.g., a connector, a receiver, a coupler, etc.) configured to receive a provided accessory. An accessory may comprise a portable device. For example, an accessory may include a body worn camera, a radio, a flashlight, an ammunition magazine, or any other item desired to be mounted to an article of wear. The mount interface may releasably receive the provided accessory. An accessory may provide a second mount interface to which the mount interface of the base plate may releasably couple.

A base plate may comprise one or more portions that are configured to engage (e.g., interlock, overlap, etc.) one or more respective structures (e.g., tabs, lips, ledges, etc.) of a buckle to limit movement of the buckle relative to the base plate. The portions may be configured to engage respective structures of the buckle in multiple directions, thereby limiting (e.g., obstructing, etc.) movement of the buckle in the multiple directions. In embodiments, a base plate may comprise a fixed (e.g., nonadjustable, inflexible, etc.) shape.

A buckle may be configured to releasably couple with a base plate over an article of wear. A buckle may be positioned on a second side of an article of wear and engage a buckle positioned on a first side of the article of wear. Engagement of the buckle with the base plate over the article of wear may couple the base plate to the article of wear. Engagement of the buckle with the base plate may compress the article of wear between the base plate and the buckle.

A buckle may comprise structures that are configured to engage respective portions of a base plate to limit movement of the base plate relative to the buckle. The structures may be configured to engage respective portions of the base plate in multiple directions, thereby limiting movement of the base plate in the multiple directions. The structures may be configured to cooperate with respective portions to couple the base plate to the buckle over an article of wear.

A buckle may comprise one or more parts configured to engage a base plate to releasably couple the buckle to the base plate. A part may provide a body from which a structure may extend. A part may comprise a structure configured to engage a respective portion of a base plate. The one or more parts may be movably coupled to one another. For example, a buckle may comprise a first part and a second part. The first part may be movably connected to the second part. The parts may be configured to articulate relative to one another to secure the buckle to the base plate and to release the buckle from the base plate. A buckle may comprise an adjustable shape in accordance with two or more parts of the buckle being movably connected.

A buckle may comprise one or more joints configured to movably couple one or more parts of a buckle. A joint may enable articulation of a first part relative to a second part in one or more directions. A joint may comprise a revolute joint (e.g., pin joint, hinge, etc.), a prismatic joint (e.g., telescoping joint), a cylindrical joint, or any other coupling configured to constrain (e.g., restrict, limit, prevent, etc.) motion of one part relative to another part. Each joint may comprise one or more degrees of freedom. For example, a joint may comprise one degree of freedom, two degrees of freedom, three degrees of freedom, or any required number of degrees of freedom.

In various embodiments, a buckle may be configured to articulate between an unlocked state and a locked state in order to couple with and decouple from a base plate. Articulation of the buckle may comprise movement of one or more parts of the buckle relative to one another. In a locked state, one or more of a position and an orientation of a first part relative to a second part may be fixed. In a locked state, a first part may be fixed relative to a second part. In a locked state, a buckle may be inseparable from a base plate. In an unlocked state, a first part may be free to move relative to a second part. In an unlocked state, a buckle may be separable from a base plate.

In various embodiments, a buckle may comprise a lock physically adjustable to dispose the buckle in an unlocked state and a locked state. A lock may be configured to control articulation of one or more parts of the buckle relative to one another. A lock may selectively apply a physical contact force (e.g., applied force, normal force, friction force, tension force, etc.) to the one or more parts to control the articulation. Alternately or additionally, the lock may selectively apply a distant force (e.g., magnetic force) to the one or more parts to control the articulation. Controlling articulation of the buckle may comprise enabling (e.g., allowing) movement of one or more parts of the buckle relative to one another and disabling (e.g., preventing) movement of one or more parts of the buckle relative to one another. A lock may enable and prevent movement of one or more parts of the buckle relative to one another in order to secure and release the buckle from a base plate. Engagement of a lock may be configured to retain (e.g., secure, lock, etc.) a buckle in a locked state. Disengagement of a lock may be configured to dispose (e.g., provide, place, etc.) a buckle in an unlocked state. An unlocked state and the locked state may be dependent on whether the lock is engaged or disengaged. Engagement of the lock may prevent movement of one or more parts of the buckle relative to one another. Disengagement of the lock may permit (e.g., enable, allow, etc.) movement of one or more parts of the buckle relative to one another. When engaged, the lock may be configured to secure the buckle to the base plate. When engaged, the lock may be configured to prevent the buckle from releasing from the base plate. When disengaged, the lock may be configured to enable the buckle to release from the base plate.

One or more forces may be applied to a lock to engage or disengage the lock. For example, a first force may be applied (e.g., by a user) to a first area of the buckle to engage the lock. A second force may be applied to a second area of the buckle to disengage the lock. The first force may result in internal compressive forces in the buckle. The internal compressive forces may cause the buckle to remain in a locked state, until acted on by the second force. The second force may relieve the internal compressive force, enabling the buckle to transition from a locked state to an unlocked state.

A buckle may engage a base plate in a first series of actions. The first series of actions may comprise aligning a buckle in an unlocked state with a base plate, applying a first force to a first area of the buckle to cause the buckle to transition to a locked state in which one or more structures of the buckle are engaged with one or more portions of the base plate. The first series of actions may be repeated in reverse to disengage the buckle from the base plate. A buckle may disengage a base plate in a second series of actions. The second series of actions may comprise applying a second force to a second area of the buckle to transition the buckle from a locked state to an unlocked state in which one or more structures of the buckle may be disengaged from one or more portions of the base plate to release the buckle from the base plate. The second series of actions for disengaging the buckle from the base plate may improve the reliability of a coupler in coupling to an article of wear. The second series of actions for disengaging the buckle from the base plate may reduce a likelihood of the buckle being unintentionally removed from the base plate leading to the coupler decoupling from the article of wear. The second series of actions for disengaging a coupler coupled to an article of wear may reduce a likelihood of the coupler being unintentionally decoupled from the article of wear.

Figure 1B:
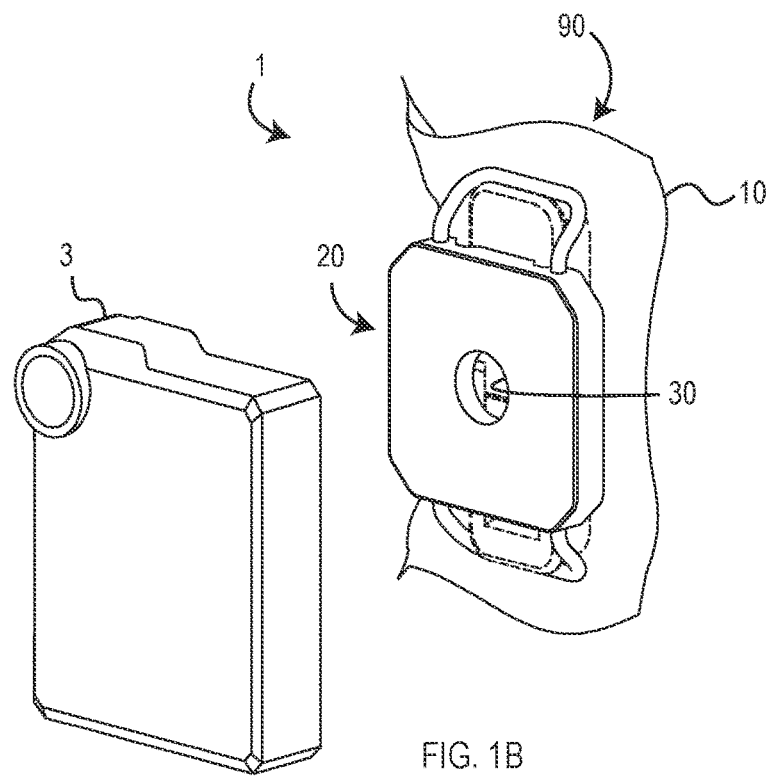
FIG. 1B is a front perspective view of the coupler of FIG. 1A coupled to an article of wear in accordance with various aspects of the present disclosure.

FIG. 1A shows an exploded view of a coupler 1, and FIG. 1B shows an assembled view of coupler 1 according to various embodiments disclosed herein. Coupler 1 may be configured to releasably couple to an article of wear, such as article of wear 10. An accessory may be configured to releasably (e.g., removably, etc.) attach (e.g., couple, etc.) to coupler 1. For example, coupler 1 may be configured to releasably attach to camera 3.

In various embodiments, coupler 1 may comprise two physically separate, but engageable components. For example, coupler 1 may include a base plate, such as base plate 20 (e.g., first part, base, front plate, etc.) and a buckle, such as buckle 50 (e.g., second part, locking lever, retainer, etc.). Each of base plate 20 and buckle 50 may comprise one or more rigid materials as described previously herein.

In various embodiments, a geometry of coupler 1 may enable buckle 50 to releasably engage base plate 20 over a range of thin and deformable materials. For example, a geometry of coupler 1 may enable buckle 50 to releasably engage base plate 20 over a provided article of wear 10. Base plate 20 may be configured to engage buckle 50 over article of wear 10, thereby providing a base to which a provided accessory may mount. Article of wear 10 may comprise a variety of articles ranging in thickness and composition. For example, a thickness of article of wear 10 may include a range of thicknesses, such as between 0.005 in to 0.150 in (0.127 mm to 3.810 mm). Article of wear 10 may comprise a variety of materials, such as textiles, foams, elastomers, and the like. Article of wear 10 may include pants, jackets, shirts, hats, overalls etc. Article of wear 10 may also include soft goods that are not worn on a person, such as fabric of a tent, parachute cloth, and other similar soft goods.

In various embodiments, base plate 20 may be disposed adjacent a first surface of article of wear 10, and buckle 50 may be disposed adjacent a second surface of article of wear 10, opposite the first surface. The first surface may be an outer surface of article of wear 10 (e.g., a surface facing away from the wearer). The second surface may be an inner surface of article of wear 10 (e.g., a surface facing toward the wearer). Buckle 50 may be configured to couple to base plate 20 over article of wear 10 without damaging article of wear 10. Article of wear 10 may conform to a shape of base plate 20 and buckle 50.

In various embodiments, an accessory may couple with coupler 1 via a mount interface of base plate 20, such as mount interface 30. Camera 3 may be removably coupled to coupler 1, while coupler 1 remains coupled to article of wear 10. Camera 3 may be removed from coupler 1, without decoupling coupler 1 from article of wear 10. Mount interface 30 may enable an accessory to be attached to base plate 20 separately from (e.g., independent of) whether buckle 50 is engaged or disengaged with base plate 20.

Figure 2A:
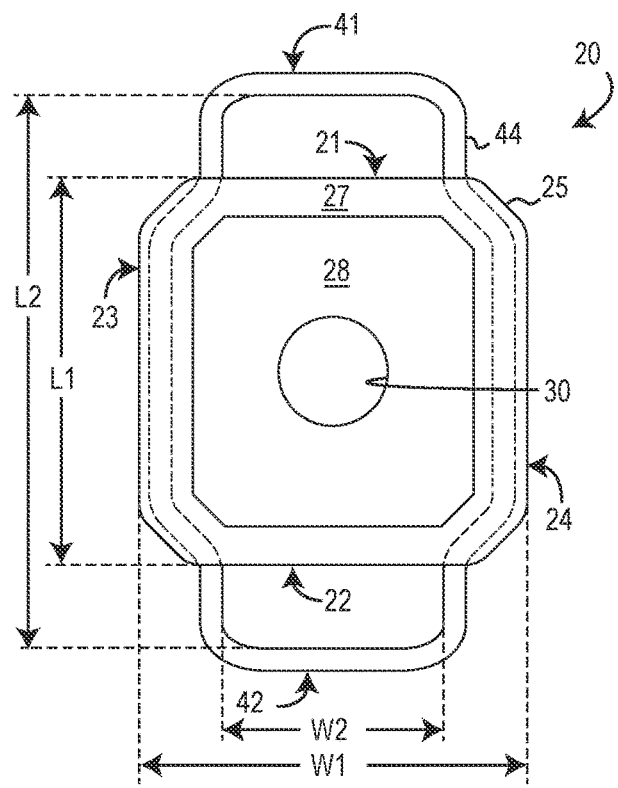
FIG. 2A is a rear view of a base plate in accordance with various aspects of the present disclosure.
Figure 2B:
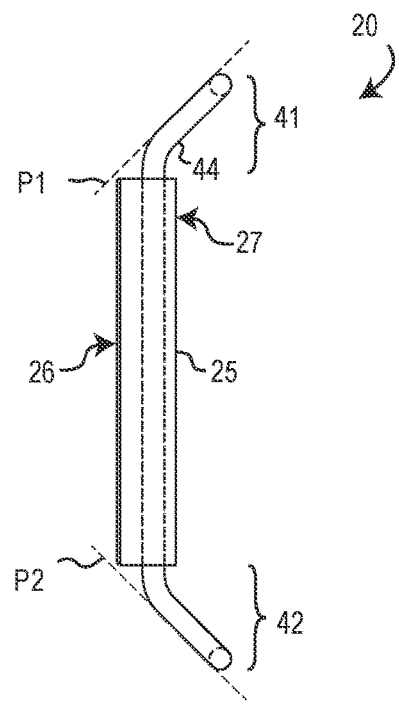
FIG. 2B is a side view of the base plate of FIG. 2A in accordance with various aspects of the present disclosure.

FIGS. 2A-2B show rear and side views of base plate 20, respectively. Base plate 20 may comprise a unitary part. Base plate 20 may be formed of one or more parts. Base plate 20 may comprise a rigid material as discussed previously herein. The material may be hardened via methods such as heat treatment. The rigid material may be treated to resist oxidation and/or include a composition that resists oxidation, such as a stainless steel. One or more portions of base plate 20 may be formed by forming (e.g., bending, etc.) a ductile material into a desired shape. For example, one or more portions of base plate 20 may comprise a rod or tube formed into the desired shape. The ends of the rod or tube may be joined (e.g., welded, etc.) together to close the desired shape. A center region of base plate 20 may be over molded over the formed rod or tube.

In various embodiments, base plate 20 may comprise a center region. For example, base plate 20 may comprise a center region 25. Center region 25 may provide a surface on which mount interface 30 is disposed. Center region 25 may be formed of a rigid material. Center region 25 may be resistant to deformation, such as bending. One or more surfaces of center region 25 may be textured or otherwise modified to improve grip between a user and base plate 20 and/or grip between base plate 20 and article of wear 10. For example, one or more surfaces of center region 25 may comprise knurling, stipples, striations, grooves, or other features to improve grip.

In various embodiments, center region 25 may extend between a first end 21 and a second end 22. First end 21 may be opposite second end 22. First end 21 and second end 22 may be parallel with one another. Center region 25 may be symmetric about a plane of symmetry that bisects first end 21 and second end 22. Base plate 20 may be symmetric about a plane of symmetry that bisects first end 21 and second end 22. First end 21 and second end 22 may each include a rectangular cross section. A maximum distance between first end 21 and second end 22 may comprise a length, such as first length L1.

In various embodiments, center region 25 may extend between a third end 23 and a fourth end 24. Third end 23 may be opposite third end 23. Third end 23 and fourth end 24 may be parallel with one another. Center region 25 may be symmetric about a plane of symmetry that bisects third end 23 and fourth end 24. Base plate 20 may be symmetric about a plane of symmetry that bisects third end 23 and fourth end 24. Third end 23 and a fourth end 24 may connect first end 21 and second end 22. Third end 23 and fourth end 24 may include a rectangular cross section. Third end 23 may be perpendicular with first end 21. Third end 23 may be perpendicular with second end 22. Fourth end 24 may be perpendicular with first end 21. Fourth end 24 may be perpendicular with second end 22. A maximum distance between third end 23 and fourth end 24 may comprise a width, such as first width W1.

In various embodiments, center region 25 may extend between a top surface 26 and a bottom surface 27. Top surface 26 may be opposite bottom surface 27. Top surface 26 may be parallel with bottom surface 27. Top surface 26 may be smooth to facilitate coupling with camera 3. Top surface 26 may be perpendicular with first end 21, second end 22, third end 23, and/or fourth end 24. Top surface 26 may join first end 21, second end 22, third end 23, and fourth end 24. In accordance with first end 21, second end 22, third end 23, fourth end 24, top surface 26, and/or bottom surface 27, center region 25 may comprise a three-dimensional portion of base plate 20.

Top surface 26 may comprise a mount interface configured to receive an accessory. For example, top surface 26 may comprise a mount interface 30, configured to receive camera 3. Mount interface 30 may include a connector, receiver, magnet, ferrous material, suction cup, smooth surface, or other interface configured to releasably couple with a complementary interface of camera 3. For example, mount interface 30 may comprise a receiver for releasably coupling with a mating connector of an item. Mount interface 30 may include a connector for releasably coupling with a mating receiver of camera 3. As a further example, mount interface 30 may comprise a ferrous material for coupling with a magnetic portion of camera 3.

In various embodiments, bottom surface 27 may comprise a recess configured to receive a portion of a buckle. For example, bottom surface 27 may comprise a recess 28. A first distance between recess 28 and top surface 26 may be less than a second distance between bottom surface 27 and top surface 26. Recess 28 may be configured to receive a portion of one or more parts of buckle 50. Recess 28 may provide space for one or more parts of buckle 50 to articulate within as described further herein.

In various embodiments, a base plate may comprise multiple portions that are each configured to engage respective structures of a buckle to releasably couple the base plate to an article of wear. The multiple portions may extend from a center region of the base plate. The multiple portions may be configured to engage complementary structures of a buckle. A shape of a base plate may complement a shape of a buckle, such that the multiple portions of the base plate engage complementary structures of the buckle to limit movement of the base plate relative to the buckle. Each portion of the multiple portions may provide a surface upon which a buckle may engage to secure the buckle to the base plate.

In embodiments, each portion of the multiple portions may comprise a respective receiver portion configured to at least partially receive a respective complementary structure of a buckle between two or more surfaces of the respective receiver portion. A respective complementary structure of a buckle may be inserted between two or more surfaces of a respective receiver portion of the base plate to selectively limit movement of a buckle relative to a base plate. A receiver portion may define a channel through which a complementary structure may be received. The complementary structure may be received through the receiver portion via the channel. In embodiments, the channel may comprise an open channel that partially surrounds a complementary structure received into the channel. Alternately, the channel may comprise a closed channel that encircles a complementary structure inserted into the channel. In various embodiments, each portion of the base plate may comprise a loop. A loop may be a shape that is geometrically produced by sweeping a closed profile about a curve. The closed profile of the loop may be round, square, hexagonal or any other closed shape. A cross-section of the closed profile may vary about the sweep of the curve. For example, a portion of the curve may have a circular cross-section while another portion of the curve may have a hexagonal cross-section. The curve may have a discrete start point and a discreet end point, such that the loop forms an open loop. As another example, the curve may have a start point coincident with an end point, such that the loop forms a closed loop. The loop may be formed of a rigid material as described previously herein.

In various embodiments, base plate 20 may comprise a first portion and a second portion. For example, base plate 20 may comprise a first portion 41 and a second portion 42. First portion 41 may extend from first end 21. Second portion 42 may extend from second end 22, first portion 41 and second portion 42 may be symmetric about a plane that bisects first end 21 and second end 22 of center portion 25. First portion 41 and second portion 42 may be symmetric about a plane that bisects third end 23 and fourth end 24. First portion 41 and second portion 42 may each have a closed profile when viewed from the side (e.g., as shown in FIG. 2B). First portion 41 and second portion 42 may each have an open profile when viewed from the rear (e.g., as shown in FIG. 2A).

In various embodiments, each of first portion 41 and second portion 42 may comprise a loop. First portion 41 and second portion 42 may comprise the same loop. For example, first portion 41 and second portion 42 may comprise a loop 44. During manufacturing, center portion 25 may be over molded over one or more loops to form first portion 41 and second portion 42. For example, center portion 25 may be molded over loop 44 such that first portion 41 extends from first end 21 of center portion 25 and second portion 42 extends from second end 22 of center portion 25. A closed profile of loop 44 may comprise a circular cross section having a diameter. A diameter of the cross section of the closed profile of loop 44 may be between 0.040 inches and 0.060 inches (1.02 millimeters and 1.52 millimeters), between 0.060 inches and 0.100 inches (1.52 millimeters and 2.54 millimeters), between 0.100 inches and 0.150 inches (2.54 millimeters and 3.81 millimeters), between 0.150 inches and 0.250 inches (3.81 millimeters and 6.35 millimeters), between 0.040 inches and 0.250 inches (10.2 millimeters and 6.35 millimeters), or any other suitable diameter.

In various embodiments, and with reference to FIG. 2B, a region of first portion 41 and a region of second portion 42 may each be tangent with a discrete plane. First portion 41 and second portion 42 may each extend in different directions relative to one another. For example, a region of first portion 41 may be tangent with a first tangent plane P1 and a second region of second portion 42 may be tangent with a second tangent plane P2. The first tangent plane and the second tangent plane may each be orthogonal to a third plane. For example, the third plane may comprise a plane from which the side view of base plate 20 is illustrated in FIG. 2B. The first tangent plane and the second tangent plane may each intersect the third tangent plane at equal and opposite angles with one another. In embodiments, the first tangent plane may be parallel with the second tangent plane. In embodiments, and in accordance with being respectively tangent with a discrete plane, each of one or more of first portion 41 and second portion 42 may comprise an angled cross-section parallel to the third plane.

In embodiments, first portion 41 and second portion 42 may each extend beyond base plate 25 in at least two directions. For example, first portion 41 may extend in a first direction beyond first end 21 and second portion 42 may extend in a second direction beyond second end 22 as shown in FIG. 2A. The first direction may be opposite the second direction. Each of the first direction and the second direction may comprise a respective direction away from center region 25 of base plate 20. First portion 41 may further extend in a third direction beyond base plate 25 and second portion may further extend in a fourth direction beyond base plate 25. The third direction may be different from the first direction. The fourth direction may be different from the second direction. The third direction may be disposed in a same plane as the first direction. The fourth direction may be disposed in a same plane as the second direction.

In various embodiments, a length of a portion of base plate 20 in a direction may be greater than a length of a center region of base 20 in a same direction. For example, a length of first portion 41 in a third direction parallel to first tangent plane P1 may be greater than a length of center region 25 in a same direction. First portion 41 may extend beyond (e.g., protrude from, etc.) center region 25 in the third direction. Further, a length of second portion 42 in a fourth direction parallel to second tangent plane P2 may be greater than a length of center region 25 in a same direction. Second portion 42 may extend beyond (e.g., protrude from, etc.) center region 25 in the fourth direction. A distal end of first portion 41 may extend beyond center region 25 such that the distal end of first portion 41 is non-coplanar with center region 25 in a plane parallel to top surface 26 of center region 25. A distal end of second portion 42 may extend beyond center region 25 such that the distal end of second portion 42 is non-coplanar with center region 25 in a plane parallel to top surface 26 of center region 25. In accordance with first portion 41 extending beyond base plate 2 in at least two directions, a first complementary structure of buckle 50 may be received between first portion 41 and buckle 50. The first complementary structure may be received by base plate 20 such that the first complementary structure does not intersect a plane in which mount interface 30 may be disposed. In accordance with second portion 42 extending beyond center region 25 in at least two directions, a second complementary structure of buckle 50 may be received between second portion 42 and buckle 50. The second complementary structure may be received by base plate 20 such that second complementary structure does not intersect a plane in which mount interface 30 may be disposed. Accordingly, one or more of first portion 41 and 42 may enable a respective complementary structure of buckle to be received, while access to top surface 26 and mount interface 30 of base plate 20 remain physically unimpeded by the one or more received respective complementary structures. Base plate 20 may be unobstructed by the one or more of first portion 41 or second portion 42 in a plane parallel to top surface 26.

Figure 3A:
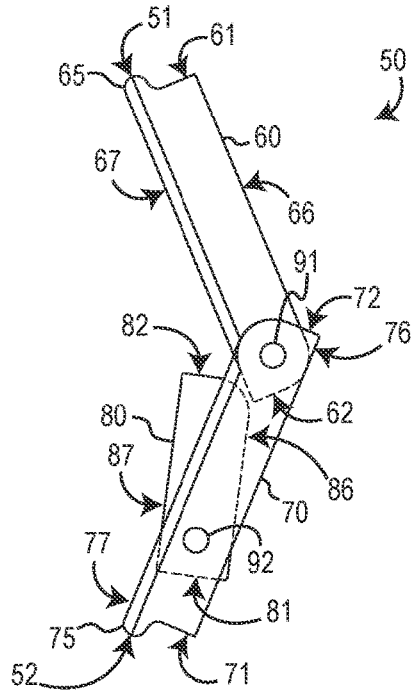
FIG. 3A is a side view of a buckle in accordance with various aspects of the present disclosure.
Figure 3B:
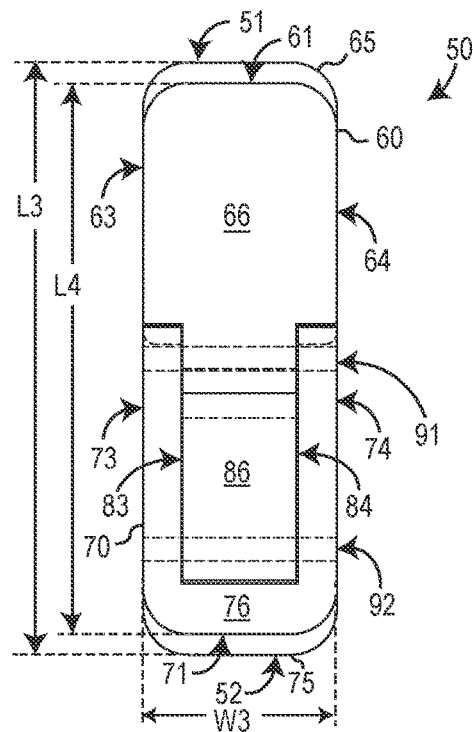
FIG. 3B is a rear view of the buckle of FIG. 3A in accordance with various aspects of the present disclosure.

In various embodiments, one or more dimensions of each of first portion 41 and second portion 42 may be sized to cooperate with a buckle (e.g., buckle 50 with brief reference to FIGS. 3A-3B). An internal dimension of base plate 20 may be a dimension defined by a minimum distance between a first point tangent with first portion 41 and a second point tangent with first portion 41 or second portion 42. For example, an internal length L2 (e.g., second length, etc.) of base plate 20 may be a length defined by a minimum distance between a first point tangent with first portion 41 and a second point tangent with second portion 42 along the direction of L1. An internal width W2 (e.g., second width, etc.) of base plate 20 may be the lesser of a width defined by a minimum distance between a first point tangent with first portion 41 and a second point tangent with first portion 41 that does not pass through first portion 41 and a width defined by a minimum distance between a first point tangent with second portion 42 and a second point tangent with second portion 42 that does not pass through second portion 42.

FIGS. 3A-3B show side and rear views of buckle 50, respectively. Buckle 50 may comprise rigid materials as discussed previously herein. The rigid materials may be hardened via methods such as heat treatment. The rigid materials may be treated to resist oxidation and/or include a composition that resists oxidation, such as a stainless steel. In various embodiments, the rigid materials may comprise plastics such as polycarbonate-acrylonitrile butadiene styrene (PC-ABS), metals such as stainless steel, and combinations thereof.

In various embodiments, buckle 50 may include one or more structures (e.g., tabs, ledges, lips, protrusions, etc.) configured to engage one or more portions of base plate 20. The one or more structure may be configured to limit movement of buckle 50 relative to base plate 20. The one or more structures of buckle 50 may limit movement of buckle 50 in multiple directions. The one or more structures may each extend from one or more parts of buckle 50.

In various embodiments, a structure may be configured to limit translation of a base plate in a first translational direction and not limit translation of the buckle in a second translational direction. The structure may comprise a first surface configured to limit translation of the base plate in the first translational direction. The structure may lack another surface to prevent translation in the second translational direction. The structure may be open in the second translational direction. The second translational direction may be one or more of opposite the first translational direction and a direction in which the structure is configured to receive the base plate. For example, the structure may be configured to receive the base plate. The structure may comprise a surface configured to limit translation of the base plate in a direction toward the surface and enable translation of the base plate in one or more directions away from the structure. The structure may partially enclose (e.g., encircle) a portion of the base plate and the portion of the base plate may also be partially unobstructed by the structure. A surface of the structure in combination with another surface of the buckle may define a notch (e.g., indentation, concave region, etc.) in which the base plate may be received. For example, a portion of a base plate may be at least partially received in a notch defined along the structure by a surface of the structure and another surface of the buckle adjacent the surface of the structure. A first translational direction limited by the structure may comprise a direction toward the surface of the structure.

In various embodiments, a buckle may comprise a pair of structures (e.g., a first structure and a second structure). The pair of structures may be diametrically opposing one another. The first structure may extend from a first part of the buckle and the second structure may be extend from a second part of the buckle. The first structure may be movable relative to the second structure. In a first state, one or more of a relative position and orientation of the pair of structures may be different than in a second state. The pair of structures may be configured to receive the base plate in the first state, but not in the second state. The pair of structures may be configured to limit translation of the base plate in the second state, but not in the first state.

In various embodiments, a buckle may comprise two or more parts each configured to articulate relative to one another. The parts may be movably coupled to one another via one or more joints. Articulating the two or more parts may enable the buckle to be releasably secured to a base plate. Each part of at least two parts of the two or more parts may comprise a respective structure. Each structure may be disposed on a separate part. Articulating the parts relative to one another may alter one or more of a relative position and orientation between the structures, enabling a buckle to releasably engage a base plate. For example, buckle 50 may comprise a first part 60 movably coupled to a second part 70.

In various embodiments, first part 60 may comprise a shape having a rectangular cross-section. First part 61 may comprise a first plate (e.g., first bar, first beam, etc.). First part 61 may comprise an elongated shape. First part 60 may extend between a first end, such as first part first end 61 (e.g., first end) and a second end, such as first part second end 62 (e.g., second end). First part first end 61 may be opposite first part second end 62. First part first end 61 may be parallel with first part second end 62. First part second end 62 may comprise a curved surface configured to cooperate with a curved surface of a lock as described further herein. A third end, such as first part third end 63 (e.g., third end) and a fourth end opposite the third end, such as first part fourth end 64 (e.g., fourth end) may connect first part first end 61 and first part second end 62. First part third end 63 may be parallel with first part fourth end 64. First part, first end 61, first part second end 62, first part third end 63, and first part fourth end 64 may include a rectangular cross section. First part third end 63 may be perpendicular with first part first end 61. First part, third end 63 may be perpendicular with first part second end 62. First part fourth end 64 may be perpendicular with first part first end 61. First part fourth end 64 may be perpendicular with first part second end 62. First part 60 may be symmetric about a plane of symmetry that bisects first part first end 61 and first part second end 62.

In various embodiments, first part 60 may extend between a first part upper surface 66 and a first part lower surface 67 that is opposite first part upper surface 66. First part upper surface 66 may be parallel with first part lower surface 67. First part upper surface 66 may be perpendicular with first part first end 61, first part second end 62, first part third end 63, and/or first part fourth end 64. First part upper surface 66 may join first part first end 61, first part second end 62, first part third end 63, and first part fourth end 64. In accordance with first part first end 61, first part second end 62, first part third end 63, first part fourth end 64, first part upper surface 66, and/or first part lower surface 67, first part 60 may comprise a three-dimensional portion of buckle 50.

In various embodiments, a structure, such as first tab 65, may extend from first part first end 61. First tab 65 may be positioned adjacent first part first end 61. First tab 65 may extend from first part first end 61 and terminate in an end such as first buckle end 51 (e.g., first tab end). A thickness of first tab 65 may be less than a thickness of first part 60 between first part upper surface 66 and first part lower surface 67. First tab 65 may be sub-flush with first part upper surface 66. First tab 65 may be flush with first part lower surface 67. Coupler 1 may be reversible in nature, such that first tab 65 may be configured to engage first portion 41 in a first state and second portion 42 in a second state. For example, first tab 65 may engage first portion 41 in a first locked state of buckle 50 in which first part 60 is disposed proximate first portion 41 and first tab 65 may engage second portion 42 in a second locked state of buckle 50 in which first part 60 is disposed proximate second portion 42.

In various embodiments, a joint, such as first joint 91 may movably couple first part 60 to second part 70. First joint 91 may be disposed proximate first part second end 62. First joint 91 may comprise a revolute joint. First joint 91 may comprise one or more colinear pins and one or more colinear holes movably coupling first part 60 to second part 70. One or more pins or one or more holes may be disposed proximate first part second end 62. For example, first part 60 may comprise a thru hole. The thru hole may be perpendicular to first part third end 63 and first part fourth end 64. The thru hole may comprise a first opening disposed on first part third end 63 and a second opening disposed on first part fourth end 64. An oversized pin may be friction-fit with the thru hole to couple first part 60 with second part 70.

In various embodiments, second part 70 may comprise a shape having a rectangular cross-section. Second part 62 may comprise a second plate (e.g., second bar, second beam, etc.) Second part 62 may comprise an elongated shape. Second part 70 may extend between a first end, such as second part first end 71 (e.g., first end) and a second end, such as second part second end 72 (e.g., second end). Second part first end 71 may be opposite second part second end 72. Second part first end 71 may be parallel with second part second end 72. A third end, such as second part third end 73 (e.g., third end) and a fourth end opposite the third end, such as second part fourth end 74 (e.g., fourth end) may connect second part first end 71 and second part second end 72. Second part third end 73 may be parallel with second part fourth end 74. Second part first end 71, second part second end 72, second part third end 73, and second part fourth end 74 may include a rectangular cross section. Second part third end 73 may be perpendicular with second part first end 71. Second part third end 73 may be perpendicular with second part second end 72. Second part fourth end 74 may be perpendicular with second part first end 71. Second part fourth end 74 may be perpendicular with second part second end 72. Second part 70 may be symmetric about a plane of symmetry that bisects second part first end 71 and second part second end 72.

In various embodiments, second part 70 may extend between a second part upper surface 76 and a second part lower surface 77 that is opposite second part upper surface 76. Second part upper surface 76 may be parallel with second part lower surface 77. Second part upper surface 76 may be perpendicular with second part first end 71, second part second end 72, second part third end 73, and/or second part fourth end 74. Second part upper surface 76 may join second part first end 71, second part second end 72, second part third end 73, and second part fourth end 74. In accordance with second part first end 71, second part second end 72, second part third end 73, second part fourth end 74, second part upper surface 76, and/or second part lower surface 77, second part 70 may comprise a three-dimensional portion of buckle 50.

In various embodiments, a structure, such as second tab 75, may extend from second part first end 71. Second tab 75 may be positioned adjacent second part first end 71. Second tab 75 may extend from second part first end 71 and terminate in an end such as second buckle end 52 (e.g., first tab end). A thickness of second tab 75 may be less than a thickness of second part 70 between second part upper surface 76 and second part lower surface 77. Second tab 75 may be sub-flush with second part upper surface 76. Second tab 75 may be flush with second part lower surface 77. Second tab 75 may be configured to engage second portion 42. Coupler 1 may be reversible in nature, such that second tab 75 may be configured to engage first portion 41 in a first state and second portion 42 in a second state. For example, second tab 75 may engage first portion 41 in a first locked state of buckle 50 in which second part 70 is disposed proximate first portion 41 and second tab 75 may engage second portion 42 in a second locked state of buckle 50 in which second part 70 is disposed proximate second portion 42.

In various embodiments, first joint 91 may movably couple second part 70 to first part 60. First joint 91 may be disposed proximate second part second end 72. First joint 91 may comprise one or more colinear pins and one or more colinear holes movably coupling second part 70 to first part 60. One or more pins or one or more holes may be disposed proximate second part second end 72. For example, second part 70 may comprise a thru hole. The thru hole may be perpendicular to second part third end 73 and second part fourth end 74. The thru hole may comprise a first opening disposed on second part third end 73 and a second opening disposed on second part fourth end 74. An oversized pin may be friction-fit with the thru hole to couple second part 70 with first part 60.

In embodiments, first part 60 and second part 70 may both be disposed along an axis of rotation defined by first joint 91. For example, first part 60 and second part 70 may be disposed adjacent to each other along a center axis of one or more pins included in first joint 91. First part 60 and second part 70 may be disposed in an alternating manner along the axis of rotation of first joint 91. For example, first part 60 may be partially received between second part 70 along first joint 91. Such an arrangement may dispose first part 60 immediately adjacent second part 70 along first joint 91, thereby enabling a lock integrated with one of first part 41 and second part 42 to directly contact the other of the second part 41 and first part 41 along the first joint 91, including as further discussed below.

In various embodiments second part 70 may comprise a void configured to receive a third part, such as third part 80. The void may enable third part 80 to be disposed between second part third wall 73 and second part fourth wall 74. The void may provide a space in which third part 80 may articulate. A shape of the void may correspond with a shape of third part 80. For example, second part 70 may comprise a void, such as void 78 (with brief reference to FIG. 1A), Void 78 may be disposed between second part third wall 73 and second part fourth wall 74. Void 78 may be contiguous with a portion of second part upper surface 76 and a portion of second part lower surface 77, such that second part 70 comprises an opening on second part upper surface 76 and second part lower surface 77. In various embodiments, in accordance with void 78, second part 70 may comprise a U-shape or a C-shape.

In various embodiments, first part 60 may be disposed adjacent void 78. First part 60 may be coupled via first joint 91 to second part 70 at an end of void 78. First part 60 and second part 70 may encircle void 78. Void 78 may be disposed within second part 70 and further enclosed by first part. 60, First part 60 may both be integrated with first joint 91 at first part second end 62 and partially surround void 78 at first part second end 62. Accordingly, a part of buckle 50 further disposed within void 78 may be provided in fluid communication with first part 60, including as further discussed below.

In various embodiments, buckle 50 may comprise a lock configured to lock (e.g., secure, maintain, etc.) One or more parts of buckle 50 in a particular orientation relative to one another. Disengagement of the lock may correspond with buckle 50 in a first state (e.g., an unlocked state). In an unlocked state, movement of one or more structures relative to one another. (e.g., first tab 65 and second tab 75) may be enabled. In an unlocked state, movement of one or more structures relative to one another (e.g., first tab 65 and second tab 75) may be enabled. An orientation and a position of parts of buckle 50 may be variable in an unlocked state. Engagement of the lock may correspond with buckle 50 in a second state (e.g., a locked state). In a locked state, movement of the one or more structures relative to one another may be prevented. An orientation and a position of parts of buckle 50 may be fixed relative to one another in a locked state.

In various embodiments, a lock may comprise a mechanism configured to selectively control articulation of buckle 50. A lock may enable (e.g., allow) and disable (e.g., prevent) articulation of buckle 50. A lock may comprise mechanisms that selectively control articulation. For example, a lock, may comprise one or more of a button lock, a lever lock, a compression lock, a frame lock, or a liner lock. In embodiments, a lock may comprise an arm and a joint.

In various embodiments, a lock may comprise a cam and a cam follower. A cam and a cam follower may be configured to translate a first applied force to an internal compressive force that maintains buckle 50 in a locked state. A cam and a cam follower may be configured to enable a second applied force to overcome the internal compressive force, thereby disengaging the lock. A cam and a cam follower may be configured to translate rotational motion to linear motion. In accordance with a particular state of a buckle, a cam may function as a cam follower and a cam follower may function as cam.

In various embodiments, a lock of buckle 50 may comprise third part 80. Third part 80 may be configured cooperate with first part 60 and second part 70 to prevent and enable articulation of buckle 50. Third part 80 may comprise an arm. Third part 80 may comprise an elongated shape in a direction between first joint 91 and an end of second part 70 opposite first joint 91. The arm may pivotably couple to another part (e.g., second part 70) of buckle 50 at a first end of the arm. The arm may rotate toward and away from the other part of buckle 50 at a second end of the arm opposite the first end of the arm.

In various embodiments, third part 80 may comprise a shape having a rectangular cross-section. Third part 80 may extend between a first end, such as third part first end 81 (e.g., first end) and a second end, such as third part second end 82 (e.g., second end). Third part first end 81 may be opposite third part second end 82. Third part first end 81 may be parallel with third part second end 82. Third part second end 82 may comprise a curved surface configured to cooperate with first part second end similar a way in which a cam cooperates with a cam follower. A third end, such as third part third end 83 (e.g., third end) and a fourth end opposite the third end, such as third part fourth end 84 (e.g., fourth end) may connect third part first end 81 and third part second end 82. Third part third end 83 may be parallel with third part fourth end 84. Third part first end 81, third part second end 82, third part third end 83, and third part fourth end 84 may include a rectangular cross section. Third part third end 83 may be perpendicular with third part first end 81. Third part third end 83 may be perpendicular with third part second end 82. Third part fourth end 84 may be perpendicular with third part first end 81. Third part fourth end 84 may be perpendicular with third part second end 82. Third part 80 may be symmetric about a plane of symmetry that bisects third part first end 81 and third part second end 82.

In various embodiments, third part 80 may extend between a third part upper surface 86 and a third part lower surface 87 that is opposite third part upper surface 86. Third part upper surface 86 may be parallel with third part lower surface 87. Third part upper surface 86 may be perpendicular with third part first end 81, third part second end 82, third part third end 83, and/or third part fourth end 84. Third part upper surface 86 may join third part first end 81, third part second end 82, third part third end 83, and third part fourth end 84. In accordance with third part first end 81, third part second end 82, third part third end 83, third part fourth end 84, third part upper surface 86, and/or third part lower surface 87, third part 80 may comprise a three-dimensional portion of buckle 50.

In various embodiments, a lock of buckle 50 may comprise a joint. For example, a lock of buckle 50 may include second joint 92. Second joint 92 may movably couple third part 80 to second part 70. Second joint 92 may be disposed proximate third part first end 81 and second part first end 71. Third part second end 82 may be disposed between second joint 92 and first joint 91 along a length of second part 70. Second joint 92 may enable third part 80 to rotate toward second part 70 to place buckle 50 in a locked state from an unlocked state. Second joint 92 may enable third part 80 to rotate in a direction away from second part 70 to place buckle 50 in an unlocked state from a locked state. Second joint 92 may prevent third part 80 from rotating through and/or beyond second part 70 when buckle 50 is placed in a locked state from an unlocked state. Second joint 92 may comprise a revolute joint. Second joint 92 may be similar to first joint 91. Second joint 92 may comprise one or more colinear pins and one or more colinear holes movably coupling third part 80 to second part 70. One or more pins or one or more holes may be disposed proximate third part first end 81. For example, third part 80 may comprise a thru hole. The thru hole may be perpendicular to third part third end 83 and third part fourth end 84. The thru hole may comprise a first opening disposed on third part third end 83 and a second opening disposed on third part fourth end 84. An oversized pin may be friction-fit with the thru hole to couple third part 80 with second part 70.

In various embodiments, third part 80 may be configured to rotate about second joint 92. At least a portion of third part 80 may be disposed within void 78 of second part 70. For example, third part first end 81 may be coupled to second part 70 within void 78. Second part second end 82 may be selectively disposed within void 78. A width of third part 80 may comprise a distance between third part third end 83 and third part fourth end 84. The width may be less than a width of second part 70 (e.g., the distance between second part third end 73 and second part fourth end 74, such that second part 70 may encircle (e.g, surround) a portion of third part 70.

In various embodiments, a length of buckle 50, such as third length L3, may comprise a maximum distance between first buckle end 51 and second buckle end 52. A fourth length L4 of buckle 50 may comprise a maximum distance between first part first end 61 and second part second end 72. In a locked state, third length L3 may be greater than second length L2 of base plate 20. In an unlocked state, third length L3 may be less than second length L2. Fourth length L4 may be less than second length L2 in an unlocked state and in a locked state. A width of buckle 50, such as third width W3, may comprise a maximum distance in a direction perpendicular to a length of buckle 50. For example, third width W3 may comprise the greater of a distance between first part third end 63 and first part fourth end 64 and a distance between second part third end 73 and second part fourth end 74. Third width W3 may be less than second width W2 of base plate 20. Accordingly, and in embodiments according to various aspects of the present disclosure, fourth length L4 of buckle 50 may be less than first length L1 of base plate 20, and third width W3 of buckle 50 may be less than second width W2 of base plate 20. Despite such relative dimensions, buckle 50 may overlap one or more structures of base plate 20 in accordance with a respective geometry of buckle 50 and base plate 20. Buckle 50 may be provided in a locked state of coupler 1 with base plate 20 in which third width W3 is aligned with second width W2 and third length L3 is aligned with second length L2. Particularly and despite such relative dimensions, each portion of one or more portions of base plate 20 (e.g., first portion 41) may encircle a respective, corresponding structure of buckle 50 in accordance with a respective geometry of buckle 50 and base plate 20.

Figure 4A:
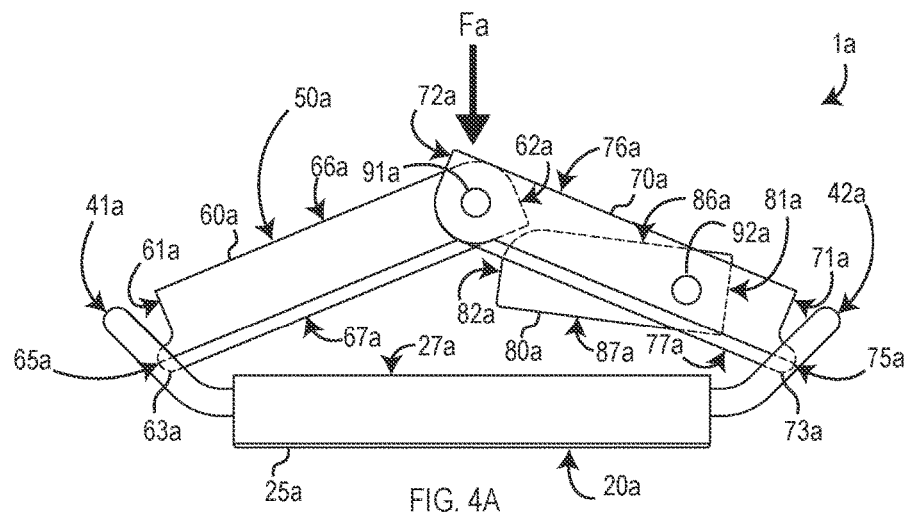
FIG. 4A is a side view of a coupler in a first state in accordance with various aspects of the present disclosure.
Figure 4B:
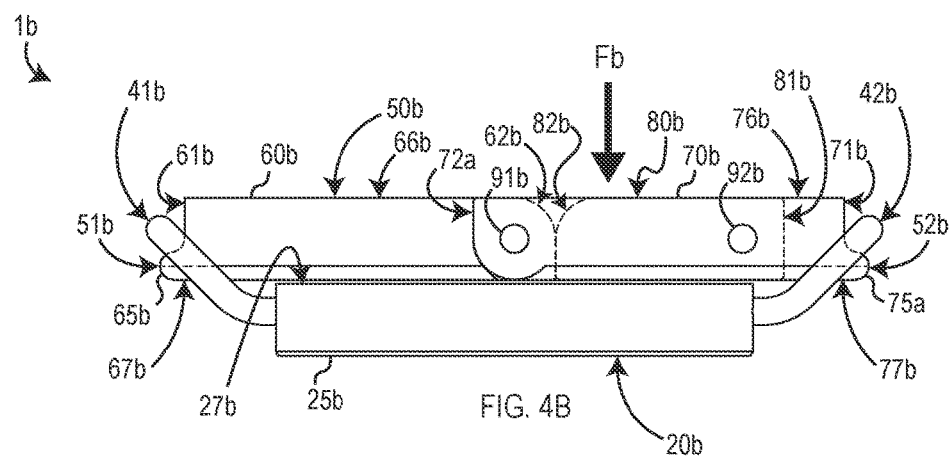
FIG. 4B is a side view of a coupler in a second state in accordance with various aspects of the present disclosure.
Figure 4C:
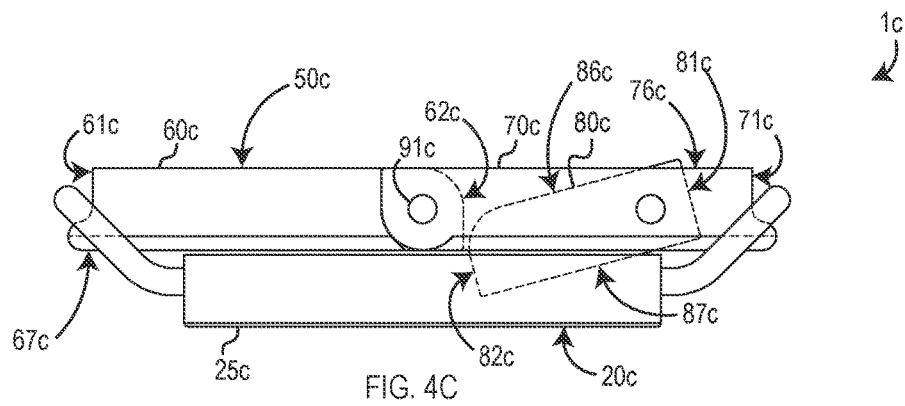
FIG. 4C is a side view of a coupler in a third state in accordance with various aspects of the present disclosure.

In accordance with various aspects of the present disclosure, FIG. 4A shows a coupler, such as coupler 1*a*, in a first unlocked state, FIG. 4B shows a coupler, such as coupler 1*b*, in a locked state, and FIG. 4C shows a coupler, such as coupler 1*c*, in a second unlocked state. In embodiments, coupler 1*a* may correspond with coupler 1*b* in a first unlocked state or coupler 1*c* in a first unlocked state. Coupler 1*b* may correspond with coupler 1*a* in a locked state or coupler 1*c* in a locked state. Coupler 1*c* may correspond with coupler 1*a* in a second unlocked state or coupler 1*b* in a second unlocked state. One or more elements or features of coupler 1*a* may correspond with one or more elements or features of coupler 1*b* or coupler 1*c*. For the coupler illustrated in FIG. 4B, corresponding elements or features are referred to using similar reference numerals under the "xxb" series of reference numerals, rather than the "xxa" as used in the embodiment of FIG. 4A, whereas for the coupler illustrated in FIG. 4C, corresponding elements or features are referred to using similar reference numerals under the "xxc" series of reference numerals.

Referring to FIG. 4A, first tab 65*a* and second tab 75*a* are each configured to engage respective structures of base plate 20*a* (e.g., first portion 41*a* and second portion 42*a*) to releasably couple base plate 20*a* to an article of wear. In various embodiments, in a first unlocked state, buckle 50*a* and base plate 20*a* may be apart, or portions of buckle 50*a* may contact portions of base plate 20*a* (e.g., via an article of wear). For example, a portion of first part lower surface 67*a* may contact a portion of bottom surface 27. A portion of second part lower surface 77*a* may contact a portion of bottom surface 27. A portion of third part lower surface 87*a* may contact a portion of bottom surface 27.

In various embodiments, in a first unlocked state, buckle 50*a* may be partially collapsed (e.g., buckled, folded, etc.). A length of buckle 50*a* between first buckle end 51*a* and second buckle end 52*a* may be less than a length of buckle 50*a* in a locked state. A length of buckle 50*a* may be less than or equal to a length of buckle 50*a* in a second unlocked state. A length of buckle 50*a* may be less than a minimum normal distance between a first point tangent with a surface of a first portion of a base plate and a second point tangent with a surface of second portion of a base plate (e.g., second length L1 with brief reference to FIG. 2A). In accordance with a length of buckle 50*a*, buckle 50*a* may manipulated to enable one or more structures to engage with one or more portions of base plate 20. For example, one or more parts of buckle 50*a* may be positioned by a user to enable one or more structures to engage with one or more portions of base plate 20. First part 60*a* may form an angle with second part 70*a* about first joint 91*a*. To enable buckle 50*a* to engage base plate 20, the angle with second part 70 may comprise an angle of less than 180 degrees and the angle with second part 70 may be provided on a side of buckle 50a facing base plate 20. Additionally, second part 70a may form an angle with third part 80a about second joint 92a. To enable buckle 50a to engage base plate 20, the angle with third part 80a may be less than 180 degrees and the angle with third part 80a may be disposed on a side of buckle 50a facing base plate 20. In embodiments, the angle with second part 70a and the angle with third part 80 may each comprise a respective non-straight (e.g., non-linear) angle.

For example, and in accordance with embodiments, one or more surfaces of one or more components of buckle 50a may be non-parallel. First part upper surface 66a may be non-parallel with second part upper surface 76a and/or second part lower surface 77a. First part lower surface 67a may be non-parallel with second part upper surface 76a and/or second part lower surface 77a. First part upper surface 66a may be non-parallel with third part upper surface 86a and/or third part lower surface 87a. First part lower surface 67a may be non-parallel with third part upper surface 86a and/or third part lower surface 87a. Third part upper surface 86a may be non-parallel with second part upper surface 76a and/or second part lower surface 77a. Third part lower surface 87a may be non-parallel with second part upper surface 76a and/or second part lower surface 77a. First part first end 61a may be non-parallel with second part first end 71a and/or second part second end 72a. First part second end 62a may be non-parallel with second part first end 71a and/or second part second end 72a. First part first end 61a may be non-parallel with third part first end 81a and/or third part second end 82a. First part second end 62a may be non-parallel with third part first end 81a and/or third part second end 82a. Third part first end 81a may be non-parallel with second part first end 71a and/or second part second end 72a. Third part second end 82a may be non-parallel with second part first end 71a and/or second part second end 72a.

In various embodiments, buckle 50a may be configured to transition from a first unlocked state to a locked state (with brief reference to FIG. 4B) responsive to receiving a first provided force, such as force Fa. Force Fa may be applied to buckle 50a to engage the lock (e.g., third part 80a). Force Fa may be applied to buckle 50a to cause buckle 50a to transition from a first unlocked state to a locked state. Force Fa may be applied proximate first joint 91a (e.g., first part second end 62a, second part second end 72a, etc.). Force Fa may be applied to either first part 60a or second part 70a to transition buckle 50a from an unlocked state to a locked state. Responsive to receiving force Fa proximate first joint 91a, first part lower surface 67a, second part lower surface 77a, and third part lower surface 87a may each contact bottom surface 27a of center region 25a. As force Fa is applied, a length between first buckle end 51a and second buckle end 52a may increase.

In various embodiments, Force Fa may be applied to a third part 80a to cause buckle 50a to transition to a locked state. Third part second end 82a may comprise a curved surface. Third part second end 82a may cooperate with first part second end 62a to secure buckle 50a in a locked state. A respective shape of each of third part second end 82a and first part second end 62a may be configured to translate force Fa to an internal compressive force that maintains buckle 50 in a locked state. For example, first part second end 62a and/or third part second end 82a may comprise an arcuate shape, such as a fillet. Responsive to receiving force Fa, first part second end 62a may rotate about first joint 91a and contact third part second end 82a. As Fa is applied and first part 60a rotates, contact between first part second end 62a and third part second end 82a may increase. As Fa is applied, rotation of first part second end 62a may cause third part second end 82a to translate, however translation may be prevented due to engagement of third part 80a with second part 70a via second joint 92. As Fa is applied, rotation of first part second end 62a may create an internal compressive force between first part second end 62a and third part second end 82a. The internal compressive force may be configured to maintain buckle 50a in a locked state.

Referring to FIG. 4B, first tab 65b and second tab 75b are each configured to engage respective structures of buckle 50b (e.g., first portion 41b and second portion 42b) to releasably couple base plate 20b to an article of wear. In various embodiments, in a locked state, one or more structures of buckle 50b may be engaged with one or more portions with base plate 20b to prevent decoupling of buckle 50b from base plate 20b.

In various embodiments, in a locked state, buckle 50b may be fully extended (e.g., expanded, etc.). A first length of buckle 50b between first buckle end 51b and second buckle end 52b (e.g., third length L3 with brief reference to FIG. 3B) may be greater than a length of buckle 50b in a first unlocked state. The first length of buckle 50b between may be greater than a second length between a first point tangent with a surface of a first portion of a base plate and a second point tangent with a surface of second portion of a base plate (e.g., second length L1 with brief reference to FIG. 2A). A third length of buckle 50b defined between first part first end 61b and second part first end 71b (e.g., length 1A with brief reference to FIG. 3B) may be less than or equal to the second length of base plate 20b.

In various embodiments, in a locked state one or more surfaces of one or more parts of buckle 50b may be parallel and/or coplanar. For example, first part upper surface 66b may be parallel with second part upper surface 76b and/or second part lower surface 77b. First part lower surface 67b may be parallel with second part upper surface 76b and/or second part lower surface 77b. First part upper surface 66b may be parallel with third part upper surface (third part upper surface 86) and/or third part lower surface (e.g., third part lower surface 87). First part lower surface 67b may be parallel with third part upper surface and/or third part lower surface. Third part upper surface may be parallel with second part upper surface 76b and/or second part lower surface 77b. Third part lower surface may be parallel with second part upper surface 76b and/or second part lower surface 77b. First part first end 61b may be parallel with second part first end 71b and/or second part second end 72b. First part second end 62b may be parallel with second part first end 71b and/or second part second end 72b. First part first end 61b may be parallel with third part first end 81b and/or third part second end 82b. First part second end 62b may be parallel with third part first end 81b and/or third part second end 82b. Third part first end 81b may be parallel with second part first end 71b and/or second part second end 72b. Third part second end 82b may be parallel with second part first end 71b and/or second part second end 72b.

In various embodiments, third part 80b may contact first part second end 62b in a locked state of buckle 50b. Third part 80b may contact first part second end 62b in a direction from second joint 92b toward first joint 91b. Third part 80b may contact first part second end 62b along an axis between second joint 92b and first joint 91b. Third part second end 82b may be aligned along an axis between first joint 91b and second joint 92b in the locked state and disposed off-axis relative to the axis between first joint 91b and second joint 92b in the unlocked state. Third part second end 82b may be aligned along an axis between first buckle end 51b and second joint 92b in the locked state and disposed off-axis relative to the axis between first buckle end 51b and second joint 92b in the unlocked state. Third part second end 82b may be disposed within a void of second part 70b in the locked state and disposed outside the void in the unlocked state. Third part second end 82b may contact first part second end 62b within the void in the locked state. Third part second end 82b may separate from first part second end 62b in an unlocked state of buckle 50b.

In various embodiments, in a locked state, one or more surfaces and one or more structures of buckle 50b may be configured to engage base plate 20b to limit movement of buckle 50b relative to base plate 20b. For example, first part lower surface 67b, second part lower surface 77b, and/or a third part lower surface (e.g., third part lower surface 87, third part lower surface 87a, etc.) may be configured to engage bottom surface 27b to limit movement of buckle 50b in a first direction. The first direction may be perpendicular to bottom surface 27b. The first direction may include a direction in which first joint 91b may move toward base plate 20 when buckle Sob is placed in the locked state from the unlocked state (e.g., as shown by buckle 50a with brief reference to FIG. 4A). First tab 65b may be configured to engage first portion 41b to limit movement of buckle 50b in a second direction. Second tab 75b may be configured to engage second portion 42b to limit movement of buckle 50b in the second direction. The second direction may be opposite the first direction. The second direction may comprise a direction in which first joint 91b may move away from base plate 25 when buckle 50b is placed in an unlocked state from the locked state. First part, first end 61b may be configured to engage first portion 41b in a third direction. The third direction may be perpendicular to the first direction and the second direction. Second part first end 71b may be configured to engage second portion 42b in a fourth direction. The fourth direction may be perpendicular to the first direction and the second direction. The fourth direction may be opposite the third direction. First part third end 63b may be configured to engage first portion 41b in a fifth direction. Second part third end 73b may be configured to engage second portion 42b in the fifth direction. The fifth direction may be perpendicular to the first direction, the second direction, the third direction, and/or the fourth direction. First part fourth end 64b may be configured to engage first portion 41b in a sixth direction. Second part fourth end 74b may be configured to engage second portion 42b in the sixth direction. The sixth direction may be perpendicular to the first direction, the second direction, the third direction, and/or the fourth direction. The sixth direction may be opposite the fifth direction.

In various embodiments, buckle 50b may be configured to transition from a locked state to an unlocked state, such as a second unlocked state (with brief reference to FIG. 4C) responsive to receiving a second provided force, such as force Fb. Force Fb may be applied to buckle 50b to cause buckle 50b to transition from a first locked state to a second unlocked state. Force Fb may be applied to third part 80b (e.g., proximate third part second end 82b) to disengage the lock (e.g., third part 80b). Responsive to receiving force Fb third part 80b may disengage first part 60b. As Fb is applied, third part 80b may rotate about second joint 92b and contact between first part second end 62b and third part second end 82b may decrease. As Fb is applied, rotation of third part 80b may relieve an internal compressive force between first part second end 62b and third part second end 82b, until third part 80b is disengaged from first part 60b.

Referring to FIG. 4C, third part 80c is disengaged from first part 60c (e.g., no contact exists between third part second end 82c and first part second end 62c). In a second unlocked state, a first tab (e.g., first tab 65, first tab 65a, first tab 65b, etc.) may still be engaged with a first portion (e.g., first portion 41, first portion 41a, first portion 41b, etc.) and a second tab (e.g., second tab 75, second tab 75a, second tab 75b, etc.) may still be engaged with a second portion (e.g., second portion 42, second portion 42a, second portion 42b, etc.) However, first part 60c may be free to rotate about first joint 91 c relative to second part 70c to enable buckle 50c to separate from base plate 20c. In the second unlocked state, a second part second end (e.g., second part second end 72, second part second end 72a, second part second end 72b, etc.) may be non-parallel with third part second end 82c.

In various embodiments, in a second locked state one or more surfaces of one or more parts of buckle 50c may be parallel and/or coplanar. For example, a first part upper surface (e.g., first upper surface 66, first upper surface 66a, first upper surface 66b, etc.) with a second part upper surface (e.g., second part upper surface 76, second part upper surface 76a, second part upper surface 76b) and/or a second part lower surface (e.g., second part lower surface 77, second part lower surface 77a, second part lower surface 77b). First part lower surface 67c may be parallel with second part upper surface 76c and/or second part lower surface 77c. First part first end 61 c may be parallel with second part first end 71 c and/or a second part second end (e.g., second part second end 72, second part, second end 72a, second part second end 72b, etc.). First part second end 62c may be parallel with second part first end 71 c and/or the second part second end.

In various embodiments, in a second unlocked state, one or more surfaces of one or more parts of buckle 50c may be non-parallel. For example, first part upper surface 66c may be non-parallel with third part upper surface 86c and/or third part lower surface 87c. First part lower surface 67c may be non-parallel with third part upper surface 86c and/or third part lower surface 87c. Third part upper surface 86c may be non-parallel with second part upper surface 76c and/or second part lower surface 77c. Third part lower surface 87c may be non-parallel with second part upper surface 76c and/or second part lower surface 77c. First part first end 61c may be non-parallel with third part first end 81b and/or third part second end 82c. First part second end 62c may be non-parallel with third part first end 81 c and/or third part second end 82c. Third part first end 81 c may be non-parallel with second part first end 71 c and/or a second part second end. Third part second end 82c may be non-parallel with second part first end 71 c and/or the second part second end 72c.

Figures 5A, 5B:
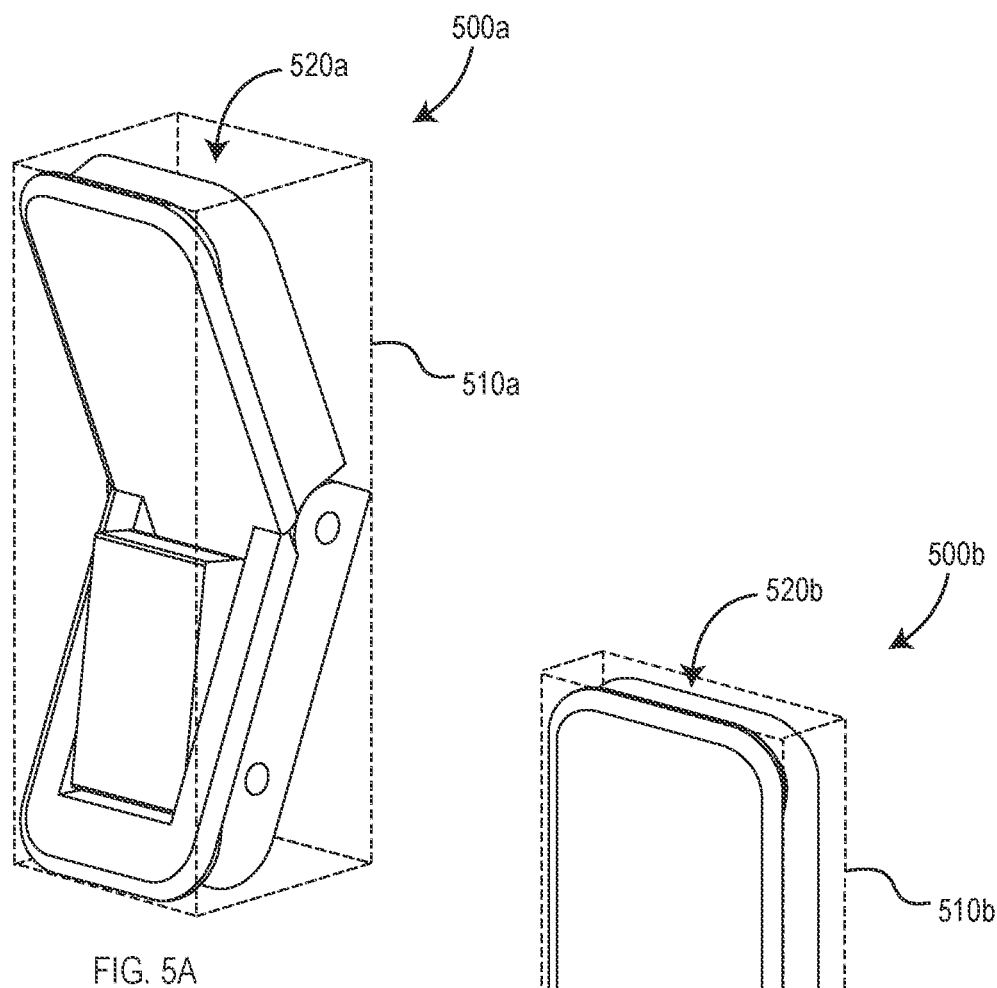
FIG. 5A is a front perspective view a coupler in an unlocked state fit within a first bounding box in accordance with various aspects of the present disclosure.
FIG. 5B is a front perspective view a coupler in a locked state fit within a second bounding box in accordance with various aspects of the present disclosure.

In accordance with various aspects of the present disclosure, FIG. 5A shows a buckle, such as buckle 500a, in an unlocked state (e.g., lock disengaged) fit within a first bounding box and FIG. 5B shows a buckle, such as buckle 500b, in a locked state (e.g., lock engaged) fit withing a second bounding box. Buckles 500a/500b may share similar aspects or parts with the buckles described previously herein (e.g., buckle 50, buckle 50a, buckle 50b, buckle 50c, etc.) In embodiments, buckle 500a may correspond with buckle 500b in an unlocked state. Buckle 500b may correspond with buckle 500a in a locked state.

In various embodiments, a bounding box may comprise a set of dimensions along three orthogonal axes. The set of dimensions may define a three-dimensional volume configured to surround (e.g., envelop, contain, etc.) an object. Each dimension in the set of dimensions may comprise a maximum dimension of the object along a corresponding axis of the three orthogonal axes. A bounding box may comprise a cuboid (e.g., rectangular cuboid, right rectangular prism, etc.). A bounding box may be sized such that each face of the bounding box touches at least one point of the object.

In various embodiments, buckle 500a, which is depicted in an unlocked state, may fit within a first bounding box 510a. A first axis associated with bunding box 510a may be oriented in a first direction between a first structure and a second structure of buckle 500a. The first axis may be disposed along a length of buckle 500a. A second axis of bounding box 510a may be oriented in a second direction perpendicular to the first axis. The second axis may be oriented parallel to a respective width of one or more of the first structure or the second structure. The second axis may be disposed along a width of buckle 500a. A third axis of the of the bounding box 510a may be perpendicular to the first axis and the second axis. The third axis may be disposed along a depth of buckle 500a. The third axis may be disposed parallel to a plane in which one degree of freedom is provided to buckle 500a by a first joint of buckle 500a. First bounding box 510a may comprise a first bounding box volume, such as first bounding volume 520a. Upon application of one or more forces to buckle 500a, a shape of buckle 500a may change. Relative positions of multiple parts of buckle 500a may change based on the application of one or more forces. For example, a first part of buckle 500a may move relative to a second part of buckle 500a. Buckle 500a may be placed in a locked state from an unlocked state. Accordingly, bounding box 510a may change as well.

Buckle 500b, which is depicted in a locked state, may fit within a second bounding box 510b. Second bounding box 510b may comprise a second bounding box volume, such as second bounding volume 520b. Second bounding box 510b may include one or more same axes as first bounding box 510a. One or more dimensions of second bounding box 510b may be different relative to corresponding measurements of first bounding box 510a. For example, a second length of second bounding box 510b may be greater than a first length of first bounding box 510a. A second depth of second bounding box 510b may be less than a first depth of first bounding box 510a. A second width of second bounding box 510b may be equal to a first width of first bounding box 510a. In accordance with the difference in lengths, buckle 500a in the unlocked state may be received within one or more portions of a base plate of a coupler while buckle 500b in the locked state may be prevented from being separated from the base plate. First bounding box 510a may be larger than second bounding box 510b. For example, first bounding volume 520a may be larger than second bounding volume 520b.

Aspects of this disclosure may relate to a coupler apparatus, methods, and systems thereof. A first example embodiment of a coupler for releasably coupling to an article of wear may comprise a base plate and a buckle. The base plate may comprise a center region, a first portion, and a second portion, the center region may include a mount interface couplable with a provided body worn camera. The buckle may comprise a first part, a second part, a first joint, and a lock, the first part may comprise a first structure, the second part may comprise a second structure, the first joint may movably couple the first part with the second part, where in an unlocked state, the lock may enable movement of the first part relative to the second part, and where in a locked state, the first structure may engage the first portion of the base plate, the second structure may engage the second portion of the base plate, and the lock may prevent the first structure from moving relative to the second structure to secure the buckle to the base plate over the provided article of wear.

A second example embodiment of a coupler for releasably coupling to an article of wear may comprise a base plate and a buckle. The base plate may comprise a center region, which may extend between a first end and a second end, where the center region may include a mount interface couplable with the provided body worn camera; a first portion, which may extend from the first end of the center region; and, a second portion, which may extend from the second end of the center region. The buckle may extend between a first buckle end and a second buckle end and comprise a first part, which may extend between a first part first end and a first part second end, the first part may comprise a first structure engageable with the first portion of the base plate, the first structure may extend from the first part first end and terminate at the first buckle end; a second part, which may extend between a second part first end and a second part second end, the second part may comprise a second structure engageable with the second portion of the base plate, the second structure may extend from the second part first end and terminate at the second buckle end; a first joint, which may movably couple the first part with the second part; and a lock physically adjustable to dispose the coupler in an unlocked state and a locked state, where in the unlocked state, the first part may be enabled to move relative to the second part about the first joint, and where in the locked state, the first part and the second part may be fixed relative to one another, the first structure may be inserted through the first portion, and the second structure may be inserted through the second portion to couple the buckle to the base plate over a provided article of wear.

A third example embodiment of a coupler for releasably securing a body camera to an article of wear may comprise a base plate and a buckle. The base plate may be couplable with a provided mount interface. The buckle may be couplable with the base plate over the provided article of wear, the buckle may comprise a first part, a second part, a third part, a first joint, a second joint, and a lock, the first joint may movably couple the first part with the second part, the second joint may movably couple the second part with the third part, and the lock may selectively enable and prevent movement of the first part relative to the second part, where responsive to receiving a first force applied proximate the first joint, the lock may be configured to prevent movement of the first part relative to the second part to secure the buckle to the base plate, and where responsive to receiving a second force applied to the third part, the lock may be configured to enable movement of the first part relative to the second part to release the buckle from the base plate.

A fourth example embodiment of a coupler may comprise a coupler as in any of the preceding example embodiments where the first portion of the base plate extends from a first end of the center region, the second portion of the base plate extends from a second end of the center region, and where the first portion opposes the second portion.

A fifth example embodiment of a coupler may comprise a coupler as in any of the preceding example embodiments where in a second locked state, the first structure may engage the second portion of the base plate and the second structure may engage the first portion of the base plate.

A sixth example embodiment of a coupler may comprise a coupler as in any of the preceding example embodiments where the first joint may enable the first part to move in a first direction opposite a direction in which the first structure engages the first portion of the base plate in the locked state.

A seventh example embodiment of a coupler may comprise a coupler as in any of the preceding example embodiments where the first joint comprises one degree of freedom of movement.

An eighth example embodiment of a coupler may comprise a coupler as in any of the preceding example embodiments where the first joint comprises a revolute joint, and where in the locked state, the lock prevents the first structure and the second structure from rotating toward each other.

A ninth example embodiment of a coupler may comprise a coupler as in any of the preceding example embodiments where in the unlocked state, the buckle fits within a first bounding box, in the locked state, the buckle fits within a second bounding box, and where the first bounding box is larger than the second bounding box.

A tenth example embodiment of a coupler may comprise a coupler as in any of the preceding example embodiments where the first joint is configured to engage the lock to prevent the first structure from moving relative to the second structure when a first provided force is applied at the first joint.

An eleventh example embodiment of a coupler may comprise a coupler as in any of the preceding example embodiments where the lock comprises a third part and a second joint movably couples the third part with the second part, and where a first provided force applied to either the first part or the second part is configured to engage the lock to prevent the first structure from moving relative to the second structure, and where a second provided force applied to the third part is configured to disengage the lock to enable the first structure to move relative to the second structure.

A twelfth example embodiment of a coupler may comprise a coupler as in any of the preceding example embodiments where in the locked state, the first part contacts the third part.

A thirteenth example embodiment of a coupler may comprise a coupler as in any of the preceding example embodiments where the center region of the base plate comprises a recess, the recess opposes the mount interface, and wherein the recess is configured to receive a portion of the third part of the buckle to disengage the lock of the buckle.

A fourteenth example embodiment of a coupler may comprise a coupler as in any of the preceding example embodiments where a first length of the base plate comprises a minimum distance between a point tangent with the first portion and a point tangent with the second portion, a second length of the buckle comprises a maximum distance between the first buckle end and the second buckle end, in the locked state, the second length of the buckle is greater than the first length of the base plate.

A fifteenth example embodiment of a coupler may comprise a coupler as in any of the preceding example embodiments where the first part first end is configured to engage the first portion in a first direction, the second part first end is configured to engage the second portion in a second direction, and the first direction is opposite the second direction.

A sixteenth example embodiment of a coupler may comprise a coupler as in any of the preceding example embodiments further comprising a third part, the third part extends between a third part first end and a third part second end, and wherein a second pin joint movably couples the third part to the second part at the third part second end.

A seventeenth example embodiment of a coupler may comprise a coupler as in any of the preceding example embodiments where in the locked state, the third part first end contacts the first part second end to prevent the first part from rotating relative to the second part.

A eighteenth example embodiment of a coupler may comprise a coupler as in any of the preceding example embodiments where the third part first end comprises a first curved surface and the first part second end comprises a second curved surface.

A nineteenth example embodiment of a coupler may comprise a coupler as in any of the preceding example embodiments where the first part comprises a void and, in the locked state, an end of the third part is received in the void and, in the unlocked state, the end of the third part is disposed outside the void.

A twentieth example embodiment of a coupler may comprise a coupler as in any of the preceding example embodiments where the first joint comprises a first pin joint and the second joint comprises a second pin joint.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. While for the sake of clarity of description, several specific embodiments of the invention have been described, the scope of the invention is intended to be measured by the claims as set forth below. In the claims, the term "provided" is used to definitively identify an object that not a claimed element of the invention but an object that performs the function of a workpiece that cooperates with the claimed invention. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing". A person of ordinary skill in the art will appreciate that this disclosure includes any practical combination of the structures and methods disclosed. While for the sake of clarity of description several specifics embodiments of the invention have been described, the scope of the invention is intended to be measured by the claims as set forth below.

The words "herein", "hereunder", "above", "below", and other word that refer to a location, whether specific or general, in the specification shall refer to any location in the specification.

What is claimed is:

1. A coupler for releasably coupling to a provided article of wear, the coupler comprising:
   a base plate, the base plate comprising a center region, a first portion, and a second portion, the center region includes a mount interface couplable with a provided body worn camera; and
   a buckle, the buckle comprising a first part, a second part, a first joint, and a lock, the first part comprises a first structure, the second part comprises a second structure, the first joint movably couples the first part with the second part; wherein:
   in an unlocked state, the lock enables movement of the first part relative to the second part; and in a locked state, the first structure engages the first portion of the base plate, the second structure engages the second portion of the base plate, and the lock prevents the first structure from moving relative to the second structure to secure the buckle to the base plate over the provided article of wear.

2. The coupler of claim 1 wherein the first portion of the base plate extends from a first end of the center region, the second portion of the base plate extends from a second end of the center region, and wherein the first portion opposes the second portion.

3. The coupler of claim 1 wherein in a second locked state, the first structure engages the second portion of the base plate and the second structure engages the first portion of the base plate.

4. The coupler of claim 1 wherein in the first joint enables the first part to move in a first direction opposite a direction in which the first structure engages the first portion of the base plate in the locked state.

5. The coupler of claim 1 wherein the first joint comprises one degree of freedom of movement.

6. The coupler of claim 1 wherein the first joint comprises a revolute joint, and wherein in the locked state, the lock prevents the first structure and the second structure from rotating toward each other.

7. The coupler of claim 1 wherein:
in the unlocked state, the buckle fits within a first bounding box;
in the locked state, the buckle fits within a second bounding box; and
the first bounding box is larger than the second bounding box.

8. The coupler of claim 1 wherein the first joint is configured to engage the lock to prevent the first structure from moving relative to the second structure when a first provided force is applied at the first joint.

9. The coupler of claim 1 wherein the lock comprises a third part and a second joint movably couples the third part with the second part, and wherein:
the lock is configured to engage the lock to prevent the first structure from moving relative to the second structure when a first provided force is applied to either the first part or the second part lock; and
the third part is configured to disengage the lock to enable the first structure to move relative to the second structure when a second provided force is applied to the third part.

10. The coupler of claim 9 wherein in the locked state, the first part contacts the third part.

11. The coupler of claim 9 wherein the center region of the base plate comprises a recess, the recess opposes the mount interface, and wherein the recess is configured to receive a portion of the third part of the buckle to disengage the lock of the buckle.

12. A coupler for releasably securing a provided body worn camera to a provided article of wear, the coupler comprising:
a base plate, the base plate comprises:
a center region, the center region extends between a first end and a second end, wherein the center region includes a mount interface couplable with the provided body worn camera;
a first portion, the first portion extends from the first end of the center region; and
a second portion, the second portion extends from the second end of the center region; and
a buckle, the buckle extends between a first buckle end and a second buckle end, the buckle comprises:
a first part, the first part extends between a first part first end and a first part second end, the first part comprises a first structure engageable with the first portion of the base plate, the first structure extends from the first part first end and terminates at the first buckle end;
a second part, the second part extends between a second part first end and a second part second end, the second part comprises a second structure engageable with the second portion of the base plate, the second structure extends from the second part first end and terminates at the second buckle end;
a first joint, the first joint movably couples the first part with the second part; and
a lock physically adjustable to dispose the coupler in an unlocked state and a locked state, wherein:
in the unlocked state, the first part is enabled to move relative to the second part about the first joint; and
in the locked state, the first part and the second part are fixed relative to one another, the first structure is inserted through the first portion, and the second structure is inserted through the second portion to couple the buckle to the base plate over a provided article of wear.

13. The coupler of claim 12 wherein:
a first length of the base plate comprises a minimum distance between a point tangent with the first portion and a point tangent with the second portion;
a second length of the buckle comprises a maximum distance between the first buckle end and the second buckle end; and
in the locked state, the second length of the buckle is greater than the first length of the base plate.

14. The coupler of claim 12 wherein in the locked state:
the first part first end is configured to engage the first portion in a first direction;
the second part first end is configured to engage the second portion in a second direction; and
the first direction is opposite the second direction.

15. The coupler of claim 12, further comprising a third part, the third part extends between a third part first end and a third part second end, and wherein a second pin joint movably couples the third part to the second part at the third part second end.

16. The coupler of claim 15 wherein in the locked state, the third part first end contacts the first part second end to prevent the first part from rotating relative to the second part.

17. The coupler of claim 16 wherein the third part first end comprises a first curved surface and the first part second end comprises a second curved surface.

18. The coupler of claim 15 wherein the first part comprises a void and, in the locked state, an end of the third part is received in the void and, in the unlocked state, the end of the third part is disposed outside the void.

19. A coupler for releasably securing a provided body camera to a provided article of wear, the coupler comprising:
a base plate, the base plate countable with a provided mount interface; and
a buckle, the buckle couplable with the base plate over the provided article of wear, the buckle comprising a first part, a second part, a third part, a first joint, a second joint, and a lock, the first joint movably couples the first part with the second part, the second joint movably couples the second part with the third part, and the lock selectively enables and prevents movement of the first part relative to the second part, wherein:
responsive to receiving a first force applied proximate the first joint, the lock is configured to prevent movement of the first part relative to the second part to secure the buckle to the base plate; and
responsive to receiving a second force applied to the third part, the lock is configured to enable movement of the first part relative to the second part to release the buckle from the base plate.

20. The coupler of claim 19 wherein the first joint comprises a first pin joint and the second joint comprises a second pin joint.

\* \* \* \* \*